J. ARCHER.
MEANS FOR TRANSMITTING POWER.
APPLICATION FILED SEPT. 24, 1917.

1,277,283.

Patented Aug. 27, 1918.
3 SHEETS—SHEET 1.

WITNESSES

INVENTOR
J. ARCHER
BY
Fetherstonhaugh & Co.
ATTYS.

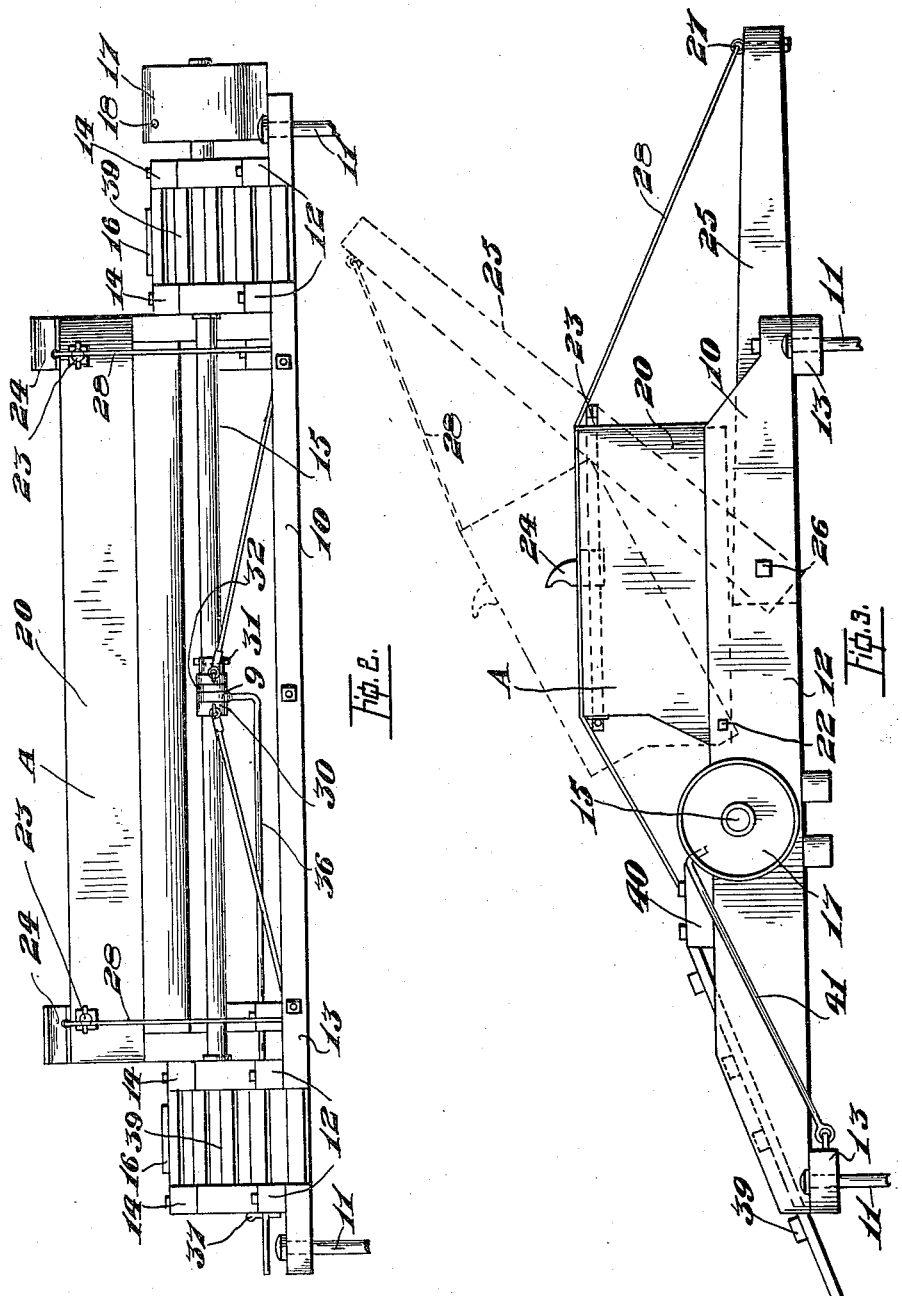

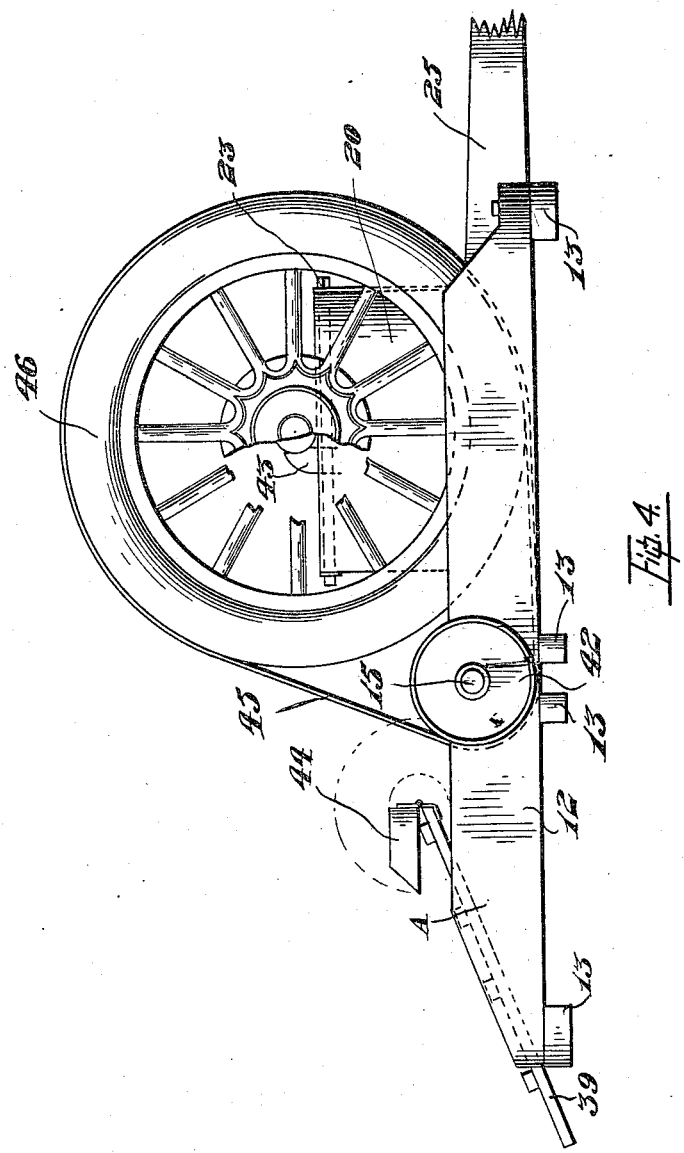

UNITED STATES PATENT OFFICE.

JOHN ARCHER, OF RED DEER, ALBERTA, CANADA, ASSIGNOR OF THREE-EIGHTHS TO ERNEST WILLIAM DE LONG AND ONE-FOURTH TO ROBERT BARCLAY WELLIVER, BOTH OF RED DEER, ALBERTA, CANADA.

MEANS FOR TRANSMITTING POWER.

1,277,283.

Specification of Letters Patent. Patented Aug. 27, 1918.

Application filed September 24, 1917. Serial No. 193,024.

*To all whom it may concern:*

Be it known that I, JOHN ARCHER, a subject of the King of Great Britain, and resident of the city of Red Deer, in the Province of Alberta, Dominion of Canada, have invented certain new and useful Improvements in Means for Transmitting Power, of which the following is a specification.

This invention relates to improvements in power transmitting devices and the objects of the invention are to facilitate utilizing the power of the driving wheels of an automobile in such a manner that the said power may be conveniently transmitted to other machinery, to so arrange the several parts of the device that it may be readily used with all ordinary makes of automobiles at present on the market, to facilitate positioning the automobile and also to lift the same clear of the power transmitting device so that it may be readily disengaged therefrom and generally to adapt the several parts to better perform the functions required of them.

With these and other objects in view the invention consists essentially of the improved construction particularly described and set forth in the following specification and accompanying drawings forming part of the same.

In the drawings:

Fig. 2 is an end elevation of the same.

Fig. 3 is a side elevation of the improved device.

Fig. 4 is a side elevation of an alternative method of transmitting the power from automobile driving wheels to other mechanism.

Like characters of reference refer to like parts in the several figures.

Figure 1:
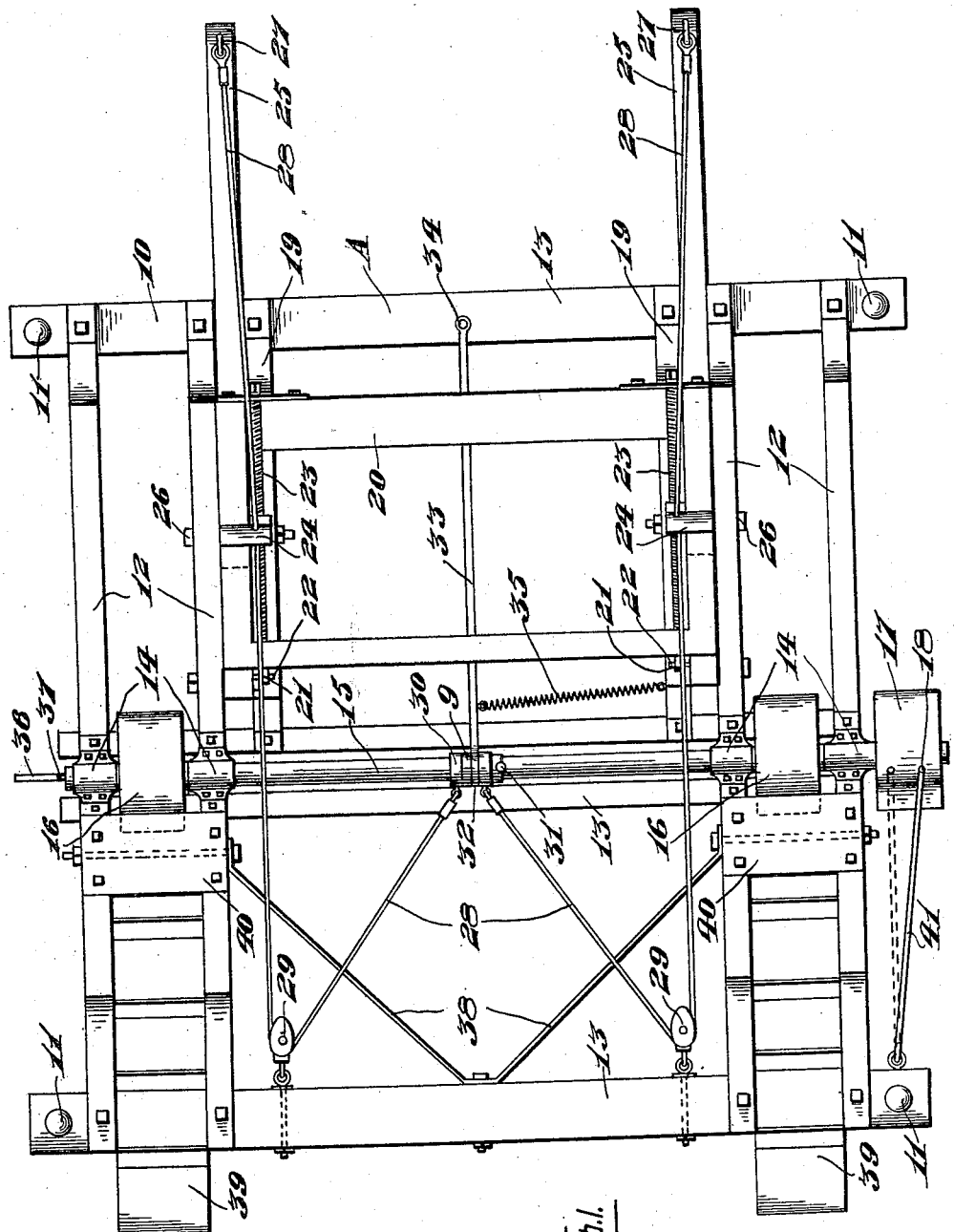
Figure 1 is a plan view of the improved power transmitting device.

Referring to the drawings, A represents the improved power transmitting device comprising a frame 10 which is anchored in position by the bolts 11. This frame consists of a plurality of longitudinally extending members 12 arranged in pairs on each side and connected by the transversely extending members 13 and intermediate of the longitudinally extending members 12 bearings 14 are located in which the shaft 15 is rotatably mounted.

The shaft 15 carries a pair of friction disks or pulleys 16 which are located between the pairs of longitudinally extending members 12 and one end of the shaft overhangs the frame 10 and is provided with a belt pulley 17 rigidly mounted thereon and having an orifice 18 through the rim.

Toward the rear of the frame 10 a pair of longitudinally extending members 19 are provided and on these members rests a cradle 20 which is of rectangular formation, provided on the front with lugs 21 through which the bolts 22 pass to hinge the cradle to the frame 10.

Adjacent to the lateral walls of the cradle longitudinally extending screws 23 are rotatably mounted, with which screws the dogs 24 make threaded engagement, so that on rotation of the screws the dogs 24 will be moved in a longitudinal direction.

The cradle 20 is designed to be rotated about the hinge bolts 22 and to facilitate performing this operation I provide arms 25 pivoted by the bolts 26 to the longitudinally extending members 12, the said arms being provided at their outer ends with eye bolts 27 connected to one end of the flexible members 28, which pass around the sheaves 29 anchored at the opposite end of the frame 10, the other end of the flexible members being connected to the clutch 30 mounted on the shaft.

This clutch is adapted to engage with a pin 31 on the shaft 15 in which position the flexible members 28 will be wound around the shaft 15 on rotation of the same and so elevate the arms 25.

The motion of the clutch 31 is controlled by a lever 33 having a collar 32 embracing the clutch intermediate of the length thereof, the other end of the lever being pivotally connected at 34 to the rear of the frame 10.

This pivoted lever 33 is adapted to be moved laterally by the action of a spring 35 so that the clutch 30 is drawn into engagement with the pin 31.

A rod 36 is provided to hold the clutch disengaged from the pin 31 and is connected at one end by the collar 9 to the clutch the other end of the said rod projecting through a pair of the side members 12 and having a pin 37 passing therethrough.

The frame 10 is braced at the front by the angularly disposed members 38 and is provided with a pair of ramps 39 located between the members 12, the said ramps being angularly disposed and anchored at one end to the transversely extending blocks 40 secured to the said members.

To prevent rotation of the shaft 15 during the operation of positioning the automobile, a rod or link 41 is provided pivotally connected to the front end of the frame 10 and having an offset free end adapted to engage with the orifice 18 in the belt pulley 17.

In that form of the invention illustrated in Fig. 4, the friction pulleys 16 illustrated in Figs. 1, 2, and 3 are replaced by belt pulleys 42 and the dogs 43 carried by the cradle 20 are reversed while the upper ends of the ramps are formed with hinged portions 44 which gives the desired clearance to permit of the belt 45 extending from the automobile wheel 46 engaging with the pulley 42.

In other respects however this form of the invention is similar to that already described, each part being the counter part of the other so that it is deemed unnecessary to further describe the same.

When that form of the invention illustrated in Figs. 1, 2 and 3 is in use the link 41 is engaged with the belt pulley 17 and so prevents rotation of the shaft 15 and the automobile is backed until the rear driving wheels run up the ramps 39 and pass over the friction pulleys 16 so that the said wheels will be located between the pair of longitudinally extending side members 12. In this position the back axle of the automobile rests on the top of the cradle 20 and by rotating the screws 23 the dogs 24 press the automobile forwardly so that the wheels which are out of contact with the ground will engage with the friction pulleys 16.

After the wheels of the automobile have engaged the friction pulleys 16 the link 41 is disengaged from the belt pulley 17 and a belt is placed on the said pulley and connected to whatever machine it is desired to drive.

The engine of the automobile is now set in motion and the back wheels of the automobile being frictionally engaged with the pulleys 16 will rotate the shafts 15 which motion will be transmitted through the belt pulley 17 and coacting belt to the machine being driven. When it is desired to remove the automobile the pin 37 is disengaged or withdrawn from the rod 36 and as a consequence the spring 35 moves the lever 33 laterally pulling the clutch 30 into engagement with the pin 31.

As the engine of the automobile is still running the flexible members 28 will be wound around the shaft 15 and as a consequence the arms 25 will be rotated about their pivot bolts 26 and so rotate the cradle 20 about its hinge bolts 22. In this way the wheels of the automobile are lifted above the friction pulleys 16 and will engage with the ramps 39 and so leave the automobile free to disengage from the frame 10. The arms 25 will under the action of gravity return to their normal position as likewise will the cradle 20 preparatory to the device being utilized to again transmit the power of the automobile to some other machine.

In that form of the invention illustrated in Fig. 4 the automobile is backed into the position in the manner above described, the dog 43 being swung downwardly on the screw 23 in order to permit the rear axle to pass over it, and when the wheel is located in the position shown in Fig. 4 the belt 45 is passed from each rear wheel 45 to the belt pulleys 42 which replace the friction pulleys 16.

The screws 23 are now adjusted until the dogs 43 engage with the rear axle of the automobile and tension the belts 45 to the desired extent whereupon the engine of the automobile is set in motion and the power is transmitted to the shaft 15, and as above described through the belt pulley 17 to the machine being driven.

To disengage the automobile from the frame 10 the arms 25 are rotated about their hinge bolts 26 in the manner above described and after the wheels 46 clear the pulleys 42, the hinged end 44 of the ramps 39 are rotated into close position to permit of the wheels 46 after passing over the pulleys 42 engaging with the said ramp and so clearing the frame 10.

As many changes could be made in the above construction, and many apparently widely different embodiments of my invention within the scope of the claims thereof, it is intended that all matter contained in the above specification and accompanying drawings be interpreted as illustrative, and not in a limiting sense.

What I claim as my invention is:

1. A power transmission device of the class described comprising a frame, a cradle on the frame, dogs movably mounted on the frame for engagement with the axle of an automobile to locate it rigidly with respect to the cradle, power transmission means on the frame and means for rotating the cradle in a vertical plane.

2. A power transmission device of the class described comprising a frame, a cradle on the frame, rotatable transmission means on the frame, means for holding the transmission means against rotation during the positioning of an automobile on the frame, and means for rotating the cradle.

3. A power transmission device of the class described comprising a frame, a cradle hinged on the frame, a shaft rotatably mounted in front of the cradle, friction means on the shaft for rotating the same, pivotally mounted legs extending rearwardly of the frame, and flexible means coacting with the shaft for rotating the legs in a vertical plane.

4. A power transmission device of the class described comprising a frame, means on the frame for engaging the rear end of an automobile to hold the driving wheels of the same disengaged from the ground, a shaft in front of the said means, friction means on the shaft coacting with the automobile wheels, legs extending rearwardly of the frame coacting with the first said means, flexible means for rotating the legs in a vertical plane, and clutch means on the shaft controlling the operation of flexible means.

5. A power transmission device of the class described comprising a frame, a cradle pivotally mounted on the frame, a shaft rotatably mounted in front of the cradle, friction pulleys on the shaft, means for rotating the cradle in a vertical plane, said means including a clutch and resilient means for throwing the clutch into operation, as and for the purpose specified.

6. A power transmission device of the class described comprising a frame, a cradle pivotally mounted on the frame, a shaft rotatably mounted in front of the cradle, means for rotating the crade in a vertical plane, said means including a clutch, a spring controlled lever coacting with the clutch, a rod coacting with the clutch, and means for rotating the shaft.

In witness whereof I have hereunto set my hand in the presence of two witnesses.

JOHN ARCHER.

Witnesses:
J. R. McClure,
E. W. De Long.

Copies of this patent may be obtained for five cents each, by addressing the "Commissioner of Patents, Washington, D. C."